United States Patent
El-Saidny et al.

(10) Patent No.: US 9,686,046 B2
(45) Date of Patent: Jun. 20, 2017

(54) SYSTEMS, METHODS AND APPARATUS FOR WIRELESS CONDITION BASED MULTIPLE RADIO ACCESS BEARER COMMUNICATIONS

(75) Inventors: Mohamed A. El-Saidny, Dubai (AE); Amer Catovic, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 170 days.

(21) Appl. No.: 13/539,217

(22) Filed: Jun. 29, 2012

(65) Prior Publication Data
US 2013/0064098 A1 Mar. 14, 2013

Related U.S. Application Data

(60) Provisional application No. 61/533,893, filed on Sep. 13, 2011.

(51) Int. Cl.
*H04W 24/00* (2009.01)
*H04L 1/16* (2006.01)
*H04L 1/00* (2006.01)

(52) U.S. Cl.
CPC .......... *H04L 1/1685* (2013.01); *H04L 1/0029* (2013.01)

(58) Field of Classification Search
CPC ..... H04W 74/06; H04W 52/20; H04W 52/26; H04B 17/0042; H04B 17/0057; H04B 17/006
USPC ........................................ 370/241, 329, 342
See application file for complete search history.

(56) References Cited

U.S. PATENT DOCUMENTS

| | | |
|---|---|---|
| 6,970,437 B2 | 11/2005 | Lott et al. |
| 7,035,240 B1 | 4/2006 | Balakrishnan et al. |
| 7,289,473 B1 | 10/2007 | Padovani et al. |
| 7,379,478 B1 | 5/2008 | Mantha |
| 7,751,320 B2 | 7/2010 | Nuzman et al. |

(Continued)

FOREIGN PATENT DOCUMENTS

| | | |
|---|---|---|
| CN | 1335004 A | 2/2002 |
| CN | 1367964 A | 9/2002 |

(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.

(Continued)

*Primary Examiner* — Andrew Chriss
*Assistant Examiner* — Romani Ohri
(74) *Attorney, Agent, or Firm* — Haojin Wang; Darren M. Simon

(57) ABSTRACT

Systems, devices, and methods for wireless condition based multi radio access based wireless communication are provided. In one aspect, a device configured to communicate via a wireless communication link is provided. The device includes a controller configured to provide an acknowledgement indicator, when the channel is configured for such operation. The controller may be configured to adjust or alter the mechanism of the acknowledgement indicator in the packets transmitted based in part on a condition of the wireless communication link and a type of wireless communication that is being transmitted by the device.

27 Claims, 4 Drawing Sheets

(56) References Cited

U.S. PATENT DOCUMENTS

| | | | |
|---|---|---|---|
| 7,962,148 B2 | 6/2011 | Stamoulis et al. | |
| 8,041,375 B2 | 10/2011 | Laroia et al. | |
| 8,620,337 B2 | 12/2013 | Meredith et al. | |
| 8,634,384 B2 | 1/2014 | Marsh | |
| 8,755,745 B2 | 6/2014 | Gandolfo | |
| 2003/0021262 A1* | 1/2003 | Ma | G06F 9/544 370/352 |
| 2005/0180449 A1 | 8/2005 | Ranta-Aho et al. | |
| 2006/0154603 A1 | 7/2006 | Sachs et al. | |
| 2006/0195727 A1 | 8/2006 | Yoshitsugu et al. | |
| 2006/0291395 A1* | 12/2006 | Ketonen | H04L 1/1685 370/236 |
| 2008/0008136 A1 | 1/2008 | Padovani et al. | |
| 2008/0043619 A1* | 2/2008 | Sammour et al. | 370/231 |
| 2008/0130584 A1 | 6/2008 | Pani et al. | |
| 2008/0132268 A1 | 6/2008 | Choi-Grogan et al. | |
| 2008/0144598 A1 | 6/2008 | Jiang | |
| 2008/0186944 A1* | 8/2008 | Suzuki | H04L 1/1685 370/349 |
| 2008/0194282 A1 | 8/2008 | Nibe et al. | |
| 2008/0226074 A1 | 9/2008 | Sammour et al. | |
| 2008/0310338 A1 | 12/2008 | Charpenter et al. | |
| 2009/0044067 A1 | 2/2009 | Obuchi et al. | |
| 2009/0093255 A1 | 4/2009 | Balasubramanian | |
| 2009/0104901 A1* | 4/2009 | Baker et al. | 455/422.1 |
| 2009/0135773 A1* | 5/2009 | Aghili et al. | 370/329 |
| 2009/0157852 A1 | 6/2009 | Krupkin et al. | |
| 2009/0161545 A1 | 6/2009 | Ho et al. | |
| 2009/0175175 A1 | 7/2009 | Somasundaram et al. | |
| 2010/0008302 A1* | 1/2010 | Sayers | H04L 63/0407 370/328 |
| 2010/0034114 A1 | 2/2010 | Kim et al. | |
| 2010/0091723 A1 | 4/2010 | Park et al. | |
| 2010/0113006 A1* | 5/2010 | Pajjuri et al. | 455/423 |
| 2010/0144363 A1 | 6/2010 | De Rosa et al. | |
| 2010/0165901 A1 | 7/2010 | Kim | |
| 2010/0195519 A1 | 8/2010 | Ji | |
| 2010/0220615 A1 | 9/2010 | Enstrom et al. | |
| 2010/0260049 A1 | 10/2010 | Racz et al. | |
| 2010/0278341 A1 | 11/2010 | Kubota | |
| 2010/0316040 A1 | 12/2010 | Kim et al. | |
| 2010/0323748 A1 | 12/2010 | Padovani et al. | |
| 2011/0009073 A1 | 1/2011 | Burbidge et al. | |
| 2011/0019756 A1 | 1/2011 | Chun et al. | |
| 2011/0105174 A1 | 5/2011 | Pelletier et al. | |
| 2011/0149787 A1 | 6/2011 | DiGirolamo et al. | |
| 2011/0158140 A1 | 6/2011 | Asokan | |
| 2011/0158194 A1 | 6/2011 | Musikka et al. | |
| 2011/0179329 A1 | 7/2011 | Kim et al. | |
| 2011/0194479 A1 | 8/2011 | Jin et al. | |
| 2011/0243080 A1 | 10/2011 | Chen et al. | |
| 2011/0249563 A1 | 10/2011 | Provvedi et al. | |
| 2011/0268088 A1 | 11/2011 | Lindskog et al. | |
| 2011/0269463 A1 | 11/2011 | Wang et al. | |
| 2011/0286387 A1 | 11/2011 | Sane et al. | |
| 2011/0317719 A1* | 12/2011 | Vedantham | H04W 28/06 370/469 |
| 2012/0002541 A1 | 1/2012 | Lee et al. | |
| 2012/0009930 A1 | 1/2012 | Brisebois et al. | |
| 2012/0020286 A1 | 1/2012 | Damnjanovic et al. | |
| 2012/0026921 A1 | 2/2012 | Choi | |
| 2012/0064908 A1 | 3/2012 | Fox et al. | |
| 2012/0069750 A1 | 3/2012 | Xing et al. | |
| 2012/0082096 A1 | 4/2012 | Cave et al. | |
| 2012/0083264 A1 | 4/2012 | Ramasamy et al. | |
| 2012/0093110 A1 | 4/2012 | Somasundaram et al. | |
| 2012/0178438 A1* | 7/2012 | Vashi et al. | 455/424 |
| 2012/0201134 A1 | 8/2012 | Wang et al. | |
| 2012/0269148 A1 | 10/2012 | Hultell et al. | |
| 2013/0003523 A1* | 1/2013 | Singh | H04L 1/1867 370/216 |
| 2013/0003542 A1 | 1/2013 | Catovic et al. | |
| 2013/0003631 A1 | 1/2013 | Catovic et al. | |
| 2013/0021915 A1 | 1/2013 | Catovic et al. | |
| 2013/0033990 A1 | 2/2013 | Catovic et al. | |
| 2013/0077616 A1 | 3/2013 | Arulprakasam et al. | |
| 2013/0148499 A1 | 6/2013 | Racz et al. | |
| 2014/0010209 A1* | 1/2014 | Hakola | H04W 24/02 370/336 |
| 2014/0133323 A9 | 5/2014 | Guarino | |
| 2015/0009950 A1 | 1/2015 | Sundberg et al. | |

FOREIGN PATENT DOCUMENTS

| | | | |
|---|---|---|---|
| EP | 1263160 A1 | 12/2002 | |
| EP | 1372310 A1 * | 12/2003 | |
| EP | 1465371 A1 | 10/2004 | |
| EP | 1653758 A1 | 5/2006 | |
| EP | 1768296 A2 | 3/2007 | |
| EP | 1793520 A1 | 6/2007 | |
| EP | 1811690 A1 | 7/2007 | |
| EP | 1956728 A2 | 8/2008 | |
| EP | 2256996 A1 | 12/2010 | |
| EP | 2317815 A1 | 5/2011 | |
| JP | 2006087113 A | 3/2006 | |
| JP | 2008048325 A | 2/2008 | |
| JP | 2008199157 A | 8/2008 | |
| JP | 2009044370 A | 2/2009 | |
| JP | 2009517935 A | 4/2009 | |
| JP | 2009188739 A | 8/2009 | |
| JP | 2011518468 A | 6/2011 | |
| JP | 2012521150 A | 9/2012 | |
| JP | 2013506364 A | 2/2013 | |
| KR | 20080112236 A | 12/2008 | |
| SE | WO 0038368 A1 * | 6/2000 | H04L 1/0025 |
| WO | 0038368 A1 | 6/2000 | |
| WO | WO 0038368 A1 * | 6/2000 | |
| WO | 0122645 A1 | 3/2001 | |
| WO | 0193513 A2 | 12/2001 | |
| WO | 2005011212 A1 | 2/2005 | |
| WO | 2005015940 A1 | 2/2005 | |
| WO | 2005112500 A1 | 11/2005 | |
| WO | 2006012377 A1 | 2/2006 | |
| WO | 2008097544 A2 | 8/2008 | |
| WO | 2009046374 A | 4/2009 | |
| WO | 2009058085 A2 | 5/2009 | |
| WO | 2009116939 A2 | 9/2009 | |
| WO | 2010088295 A1 | 8/2010 | |
| WO | 2010107360 A1 | 9/2010 | |
| WO | 2011025438 A1 | 3/2011 | |
| WO | 2011072735 A1 | 6/2011 | |

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).

Brunner, et al., "Inter-System Handover Parameter Optimization," 2006 IEEE 64th Vehicular Technology Conference, pp. 1-6.

International Search Report and Written Opinion—PCT/US2012/045334—ISA/EPO—Oct. 11, 2012.

Siemens: "Contribution to Power Limit Problem in HSDPA Case", 3GPP Draft; R2-040981, 3rd Generation Partnership Project (3GPP), Mobile Competence Centre ; 650, Route Des Lucioles ; F-06921 Sophia-Antipolis Cedex ; France, vol . RAN WG2, no. Montreal, Canada; May 17, 2004, May 17, 2004 (May 17, 2004), XP050125851.

Xu, et al., "Performance Analysis on the Radio Link Control Protocol of UMTS System," Proceedings from 2002 IEEE 56th Vehicular Technology Conference, vol. 4, pp. 2026-2030.

Samsung, "CQI and ACK/NACK Transmission Supporting Dual-Cell HSDPA", 3GPP TSG-RAN WG1#54b, R1-083562, Oct. 3, 2008.

Renesas Mobile Europe Ltd: "Cell update-less RLC/PDCP unrecoverable error recovery", 3GPP R2-113178, 3GPP, May 9, 2011, 2 Pages.

* cited by examiner

SYSTEMS, METHODS AND APPARATUS FOR WIRELESS CONDITION BASED MULTIPLE RADIO ACCESS BEARER COMMUNICATIONS

CROSS-REFERENCE TO RELATED APPLICATIONS

The disclosure claims priority to U.S. Provisional Patent Application No. 61/533,893 filed Sep. 13, 2011, entitled "SYSTEMS, METHODS AND APPARATUS FOR WIRELESS CONDITION BASED MULTIPLE RADIO ACCESS BEARER COMMUNICATIONS" and assigned to the assignee hereof. The disclosure of this prior application is considered part of, and is incorporated by reference in, this disclosure.

FIELD

Aspects of the present invention relate to wireless communication, and in particular, to systems, method and apparatus configured to enable multiple radio access bearer communications based on wireless conditions.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide connectivity between a wireless terminal or terminals and the core communications network. In a UMTS radio access network (RAN), the functionalities of a base station may be split across two network elements: the Radio Network Controller (RNC) handles, among other functions, connection setup, resource assignment and mobility; the base node (NodeB) configured to handle the radio transmission and reception to and from wireless terminals as well as the resource allocation for connected users on the shared channels.

To establish a call connection between a wireless terminal and a base station, a Radio Access Bearer (RAB) is needed. The RAB carries voice or other data between the wireless terminal and the core communication network. There are different types of RABs for different types of data, such as, for example, voice data, streaming data (e.g. streaming a video clip), interactive data (e.g. interacting with a website) and others. Simultaneous voice and data connections require multiple RABs and may be referred to as Multi-RAB or MRAB connections. In the early days of combined voice and data networks, e.g. 3G UMTS, simultaneous voice and data connections were not prevalent. However, newer wireless terminal devices (e.g. touch-screen cellular telephones) increasingly use voice and data connections simultaneously. MRAB calls are known to experience an increased rate of dropped calls or connections compared to single RAB calls or connections. One cause for may be due to, for example, variable wireless signal conditions. Accordingly, there is a need to improve the communication between a wireless terminal and a base station during MRAB calls.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage power allocation to various channels in MRAB calls.

In one aspect, a device configured to communicate via a wireless communication link is provided. The device includes a controller. The controller is configured to provide an acknowledgement indicator. The controller is further configured to adjust the acknowledgement indicator based in part on a condition of the wireless communication link and a type of wireless communication that is being transmitted by the device. The condition of the wireless communication link may include a quality of a wireless signal received by the device, an error rate for signals received by the device, a number of packet re-transmissions from the device, and a reset of the wireless communication link. The type of wireless communication is a multicast radio access bearer communication. The acknowledgement indicator comprises a bit in a packet header field. The wireless communication link comprises a universal mobile telecommunication system. The wireless communication link comprises a 3G system.

In another aspect, a method of wireless communication is provided. The method includes establishing a wireless communication link. The method includes altering an acknowledgement indicator transmitted via the wireless communication link based in part on a condition of the wireless communication link and a type of wireless communication being transmitted. In some implementations, altering the acknowledgement indicator may be based on a multiple radio access bearer wireless communication type. In some implementations, altering the acknowledgement indicator may be based on the condition of the wireless communication link comprises altering the acknowledgement indicator based on at least one of a quality of a wireless signal received by the device, an error rate for signals received by the device, a number of packet re-transmissions from the device, and a reset of the wireless communication link.

In some implementations, altering the acknowledgement indicator may include altering a packet header value.

In yet another aspect, another device configured to communicate via a wireless communication link is provided. The device includes means for establishing the wireless communication link. The device includes means for altering an acknowledgement indicator transmitted via the wireless communication link based in part on a condition of the wireless communication link and a type of wireless communication being transmitted by the device.

The means for altering may be configured to alter the acknowledgement indicator based on a multiple radio access bearer wireless communication type. In some implementations, the means for altering are configured to alter the acknowledgement indicator based on at least one of a quality of a wireless signal received by the device, an error rate for signals received by the device, a number of packet re-transmissions from the device, and a reset of the wireless communication link. The means for altering the acknowledgement indicator may include means for altering a packet header value.

In another aspect, a non-transitory computer readable storage medium comprising instructions is provided. The instructions, when executed by a processor of an apparatus, cause the apparatus to establish a wireless communication link. The instructions further cause the apparatus to alter an acknowledgement indicator transmitted via the wireless communication link based in part on a condition of the wireless communication link and a type of wireless communication being transmitted by the apparatus. In some implementations, altering the acknowledgement indicator may be based on a multiple radio access bearer wireless communication type. In some implementations, altering the acknowledgement indicator may be based on the condition of the wireless communication link comprises altering the acknowledgement indicator based on at least one of a quality of a wireless signal received by the device, an error rate for signals received by the device, a number of packet re-transmissions from the device, and a reset of the wireless communication link. In some implementations, altering the acknowledgement indicator may include altering a packet header value.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
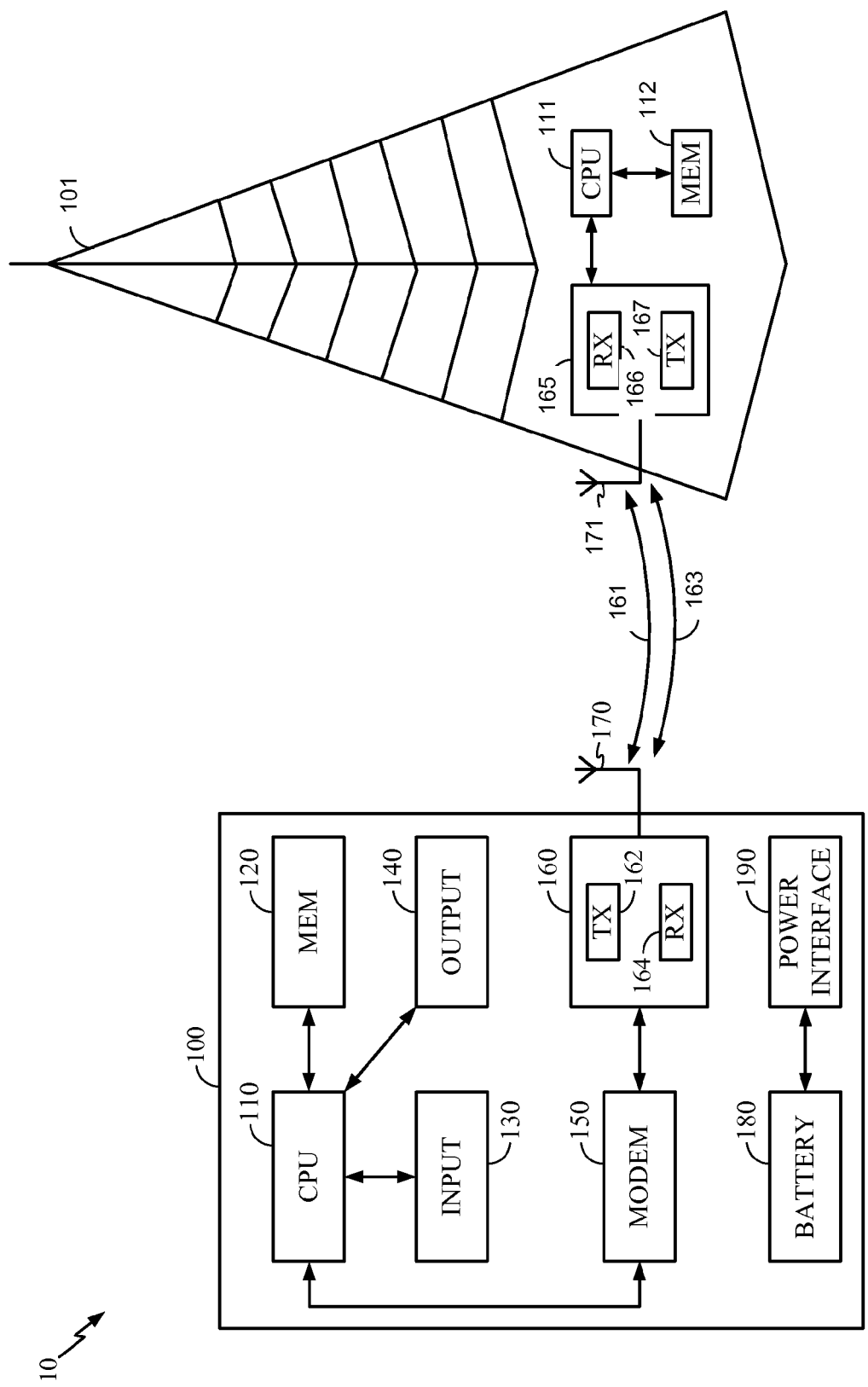
FIG. 1 shows an exemplary functional block diagram of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2).

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (UE) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

FIG. 1 shows an exemplary functional block diagram of a wireless communication system. The wireless communication system 10 may include at least one wireless terminal 100 and at least one base station 101 configured to communicate with each other over a first communication link 161 and a second communication link 163. Each of the first and second communication links 161, 163 can be a single-packet communication link on which a single packet may be transmitted during each cycle or a multi-packet communication link on which multiple packets may be transmitted during each cycle. For example, the first communication link 161 can be a dual-packet communication link on which zero, one, or two packets can be transmitted during each cycle.

In the implementation shown in FIG. 1, the wireless terminal 100 includes a processor 110 coupled with a memory 120, an input device 130, and an output device 140. The processor may be coupled with a modem 150 and a transceiver 160. The transceiver 160 shown is also coupled with the modem 150 and an antenna 170. The wireless terminal 100 and components thereof may be powered by a battery 180 and/or an external power source. In some implementations, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be implemented in a single chip. Similarly, two or more of the processor 110, modem 150, and transceiver 160 may be implemented in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

In the implementation shown in FIG. 1, the processor 110 can be coupled, via one or more buses, with read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled with an input device 130 and an output device 140 configured for, respectively, receiving input from and providing output to, a user of the wireless terminal 100. Suitable input devices may include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled with audio processing software to, e.g., detect voice commands). Suitable output devices may include, but are not limited to, visual output devices, including displays and printers, audio output devices, including speakers, headphones, earphones, and alarms, and haptic output devices, including force-feedback game controllers and vibrating devices.

The processor 110 may be coupled with a modem 150 and a transceiver 160. The modem 150 and transceiver 160 may be configured to prepare data generated by the processor 110 for wireless transmission over the communication links 161, 163 via the antenna 170. The modem 150 and transceiver 160 also demodulate data received over the communication links 161, 163 via the antenna 170. In some implementations, the modem 150 and the transceiver 160 may be configured to operate according to one or more air interface standards. The transceiver can include a transmitter 162, a receiver 164, or both. In other implementations, the transmitter 162 and receiver 164 are two separate components. The modem 150 and transceiver 160, can be implemented as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof may be powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some implementations, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some implementations, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

As shown in FIG. 1, the base station 101 also includes at least a processor 111 coupled with a memory 112 and a transceiver 165. The transceiver 165 includes a transmitter 167 and a receiver 166 coupled with an antenna 171. The processor 111, memory 112, transceiver 165, and antenna 171 can be implemented as described above with respect to the wireless terminal 100.

In the wireless communication system 10 of FIG. 1, the base station 101 can transmit data packets to the wireless terminal 100 via a first communication link 161 and/or a second communication link 163.

Figure 2:
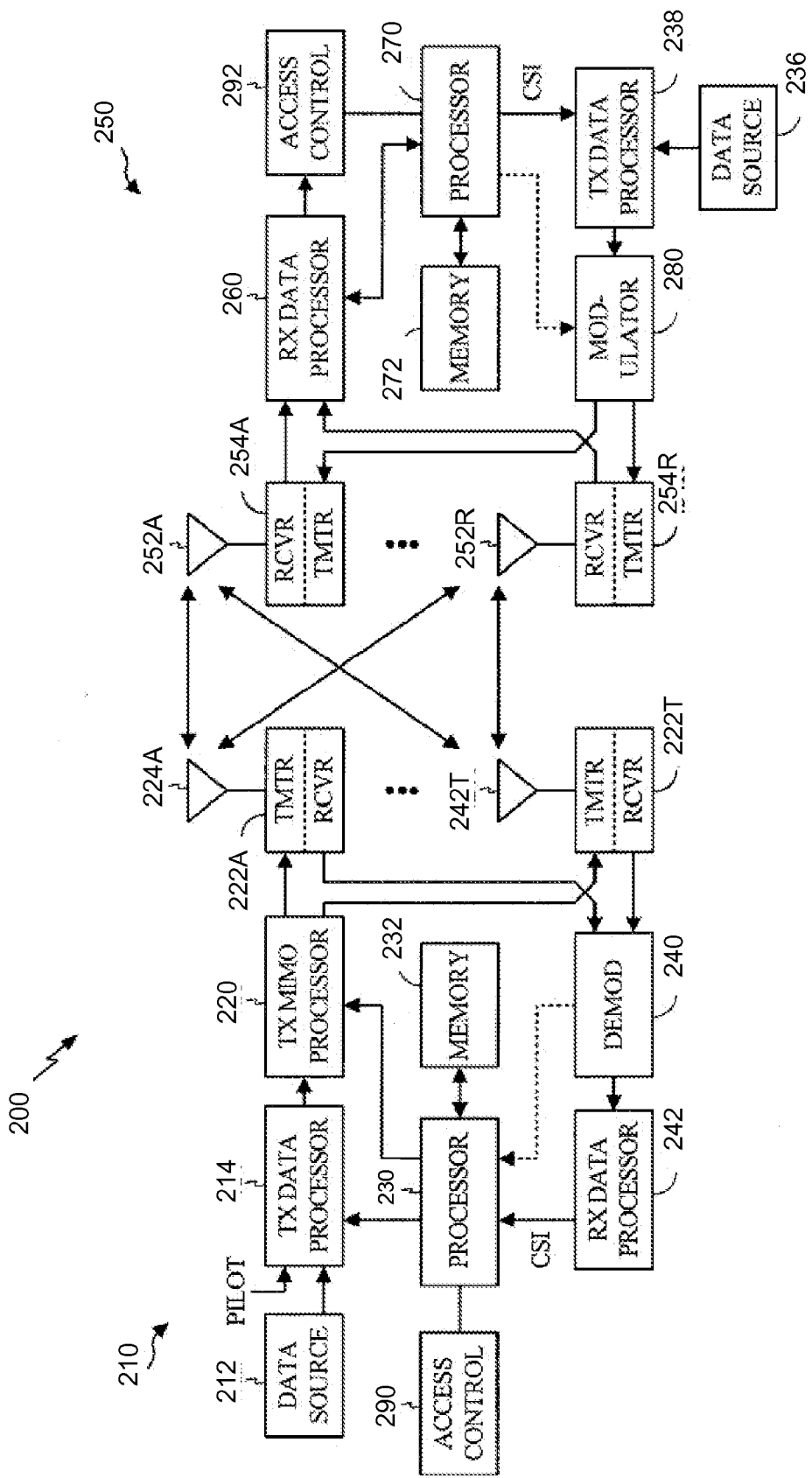
FIG. 2 shows an exemplary functional block diagram of components that may be employed to facilitate communication between communication nodes, such a wireless terminal and a base station.

FIG. 2 shows an exemplary functional block diagram of components that may be employed to facilitate communication between communication nodes, such a wireless terminal and a base station. Specifically, FIG. 2 is a simplified block diagram of a first wireless device 210 (e.g., a base station) and a second wireless device 250 (e.g., a wireless terminal) of a communication system 200. At the first device 210, traffic data for a number of data streams is provided from a data source 212 to a transmit (TX) data processor 214.

In some implementations, each data stream is transmitted over a respective transmit antenna. The TX data processor 214 may be configured to format, code, and interleave the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 210.

In the implementation shown in FIG. 2, the modulation symbols for some data streams may be provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the channel. Modulated signals from transceivers 222A through 222T are then transmitted from antennas 224A through 224T, respectively.

At the second device 250, the transmitted modulated signals are received by antennas 252A through 252R and the received signal from each antenna 252 is provided to a respective transceiver (XCVR) 254A through 254R. Each transceiver 254 may be configured to condition (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 210.

The processor 270 formulates an uplink message, which may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the second device 250 are received by the antennas 224, conditioned by the transceivers 222, demodulated by a demodulator (DEMOD) 240, and processed by an RX data processor 242 to extract the uplink message transmitted by the second device 250. The processor 230 then processes the extracted message.

FIG. 2 also illustrates that the communication components may include one or more components that perform access control. For example, an access control component 290 may cooperate with the processor 230 and/or other components of the device 210 to send/receive signals to/from another device (e.g., device 250). Similarly, an access control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the access control component 290 and the processor 230 and a single processing component may provide the functionality of the access control component 292 and the processor 270.

The interface between base stations and wireless terminals may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal. This layer may additionally provide control of aspects of the wireless terminal from the base station and may include functions to control radio bearers, physical channels, mapping of different channel types, measurement and other functions.

To ensure proper handling of data packets transmitted, various protocols may be implemented to allow the wireless terminal and the base station to coordinate data packet transmission. One such protocol used in UMTS is the Radio Link Control (RLC) protocol specified in 3GPP TS 25.322. According to the RLC protocol, a radio link may be configured by the base station to operate in "acknowledged mode (AM)". For example, a data packet transmitted by a wireless terminal may be acknowledged by a base station. The acknowledgement may be transmitted from the base station once the data packet is received at the base station. In some implementations, it may be desirable to transmit acknowledgements from the base station in batches to the wireless terminal. For example, a wireless terminal may transmit an indicator to the base station (e.g., in a header field) indicating a request for acknowledgement of the data packets received by the base station. The rules for transmitting the acknowledgment indicator (poll bit) are configurable by the base station. For example, in some implementations the base station may specify an acknowledgement request frequency period during which the wireless terminal may request acknowledgement of packets received by the base station.

The wireless terminal may compare the acknowledged data packets with a list of data packets transmitted. The wireless terminal may retransmit any data packets that the base station has not acknowledged. In some instances, if a packet has been unsuccessfully retransmitted (e.g., no acknowledgement received) a specified number of times, the wireless terminal may be configured to attempt to reset the communication link with the base station. In some instances, wireless communication conditions may cause either the packet including the acknowledgement request to fail to reach the base station or the acknowledgement signal to reach the wireless terminal.

Wireless communication conditions may prevent the wireless terminal and base station from exchanging the appropriate signals to reset the communication link. In some instances, if the wireless terminal attempts a specified number of resets and is unsuccessful, the wireless terminal may be configured to disconnect from the base station under the assumption that the communication link with the base station is irreparable. If the wireless terminal has an active MRAB connection, the wireless terminal may disconnect not only the data communication portion but also the voice communication portion even though the faulty link is the data communication link.

Thus, one cause contributing to higher dropped connection rates for MRAB connections (e.g. simultaneous voice and data connections) as compared to single RAB connections (e.g. voice only connection) is a failure of acknowledgement exchanges between the wireless terminal and the base station over the data communication link during poor wireless communication conditions. The wireless communication conditions may be suitable for voice connections; however, the wireless terminal may be configured to reset the all wireless connections when a failure occurs on only one wireless connection. Accordingly, one method to reduce dropped wireless connections at the wireless terminal may include altering the acknowledgement expectations of the wireless terminal and/or the base station based on the type of call and the wireless communication conditions.

Another mode of operation of the RLC protocol configurable by the base station is "unacknowledged mode (UM)". In this mode, a data packet transmitted by a wireless terminal need not be acknowledged by the base station hence the wireless terminal need not transmit an indicator to the base station (e.g., in a header field) indicating a request for acknowledgement of the data packets received by the base station. Consequently, the packet header associated with the UM does not contain the acknowledgment indicator.

Yet another mode of operation of the RLC protocol proposed in this invention is the "device-initiated UM". This mode is a variation of the acknowledged mode and uses the packet header format associated with the acknowledged mode. In the device-initiated UM mode the device unilaterally modifies the rules for transmitting the acknowledgment indicator configured by the base station by not transmitting the acknowledgment indicator. As a result, the device will not have expectations with respect to receiving acknowledgments from the base station for the transmitted packets. Consequently, the radio link will never need to be reset and the radio link failures due to missing acknowledgments will never occur.

Figure 3:
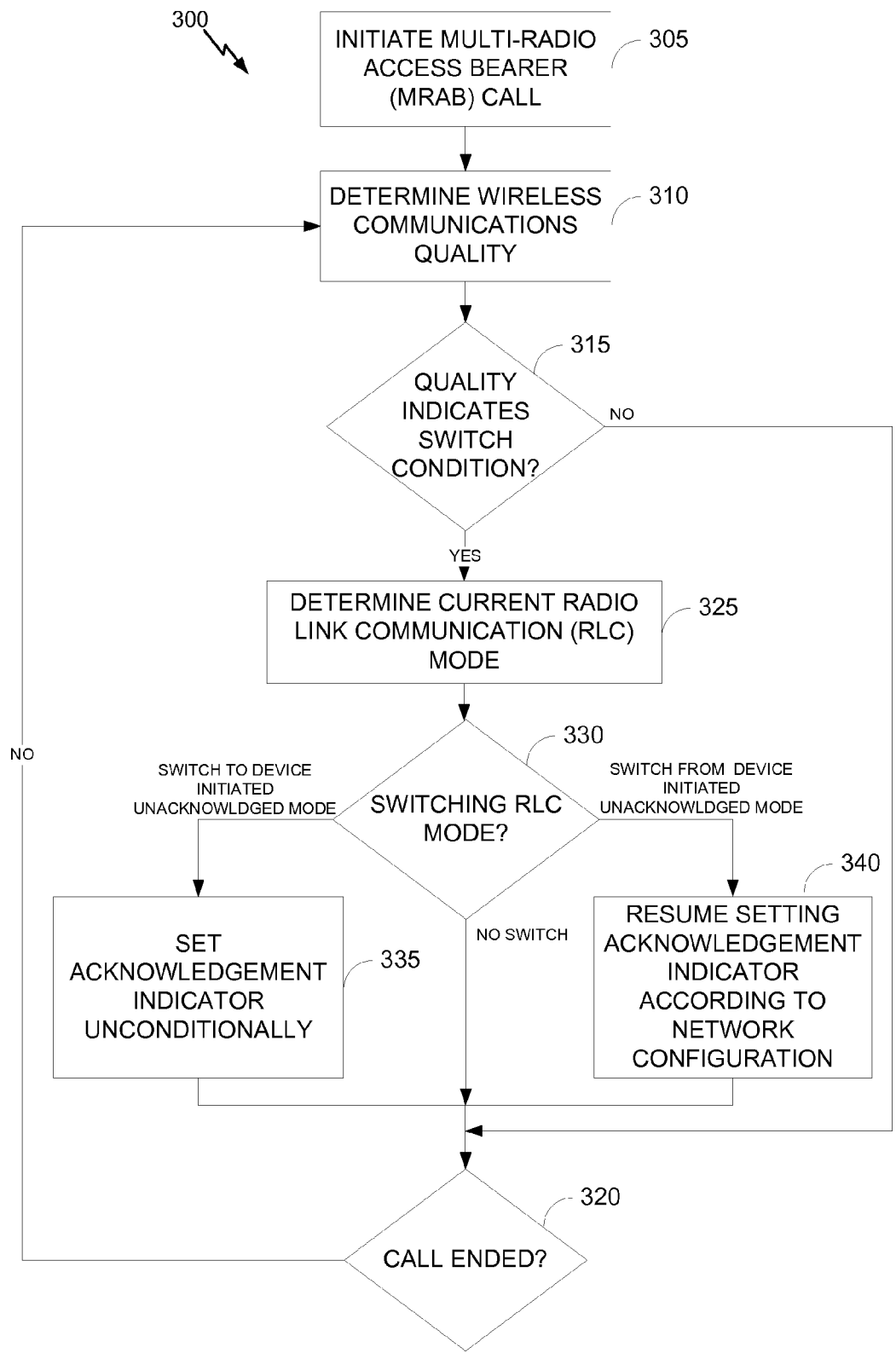
FIG. 3 shows an exemplary flowchart illustrating an implementation of a method of wireless condition based communication in a wireless terminal.

FIG. 3 shows an exemplary flowchart illustrating an implementation of a method of wireless condition based communication in a wireless terminal. The method 300 begins at block 305 where a multi radio access bearer call is initiated and the RLC protocol controlling the data radio bearer is configured to operate in acknowledged mode. At block 310, the quality of the wireless communications is determined. The quality of the wireless communication may be determined based on a wireless signal quality factor (e.g., received signal code power, received signal strength, pilot channel quality, channel quality indicator), a block error rate (e.g., physical layer, medium access control layer, radio link control layer), the number of packets re-transmitted by the wireless terminal, the number of packets acknowledged by the base station, the number of packets unacknowledged by the base station, the occurrence of a radio link control layer reset, the transmit power of the device exceeding a threshold, or other indicia of poor wireless communication conditions. In some implementations, a controller may obtain the various quality indicators directly or indirectly from one or more detectors. A detector may provide the quality indicators by storing the detected quality indicators in a memory. The quality may be discrete or be an aggregated assessment (e.g., average values for a factor, composite calculation including multiple factors).

At decision block 315, the quality determined is assessed to determine if a switch in communication mode is appropriate. For example, a processor may compare the quality determined with a threshold wireless quality level stored in a memory. In the case where the quality indicates a condition wherein a switch is not needed, the method 300 continues to decision block 320. At decision block 320 the method 300 determines whether the call is still active. If the call is active, the method 300 returns to block 310 to again assess the quality of the wireless communications. In some configurations, a timer may be included such that the determination of block 310 is performed at a specified interval.

Returning to block 315, if the quality indicates a condition wherein a switch is needed, the method 300 continues to block 325. At block 325, the current radio link control (RLC) mode for the data radio bearer in the wireless terminal is determined. According to one implementation, the modes for the wireless terminal may include: a device-initiated unacknowledged mode, or acknowledged mode configured initially by the RAN.

At block 330, if the current RLC mode is the acknowledged mode, the method 300 continues to block 335. At block 335, the wireless terminal is configured to switch to device-initiated UM by setting an acknowledgement indicator unconditionally on packets transmitted to the base station such that no acknowledgement is requested from the base station. Conversely, returning to block 330, if the current RLC mode is device-initiated UM, the method continues to block 340. At block 340, the wireless terminal is configured to set an acknowledgment indicator in accordance with the network configuration.

Figure 4:
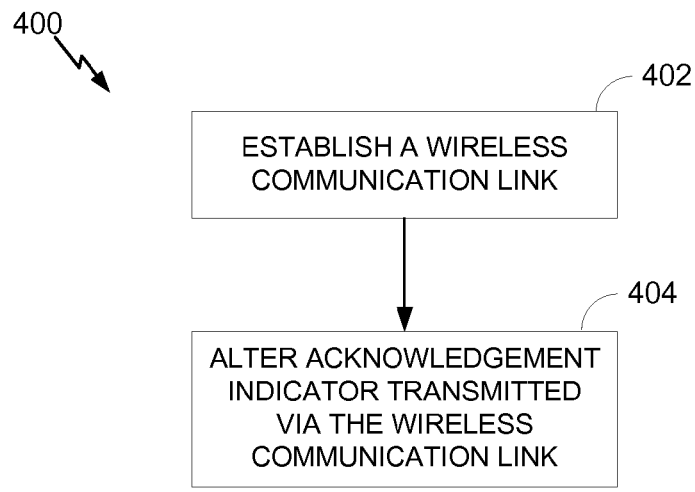
FIG. 4 shows an exemplary flowchart illustrating another implementation of a method of wireless condition based communication in a wireless terminal.

FIG. 4 is a flowchart illustrating another implementation of a method of transmission power control in a wireless terminal. The method 400 begins at block 402 where the wireless terminal establishes a wireless communication link. At block 404, the wireless terminal alters an acknowledgement indicator transmitted via the wireless communication link. The indicator may be altered based on the condition of the wireless communication link, such as those quality factors discussed above, and the type of wireless communication (e.g., MRAB).

Figure 5:
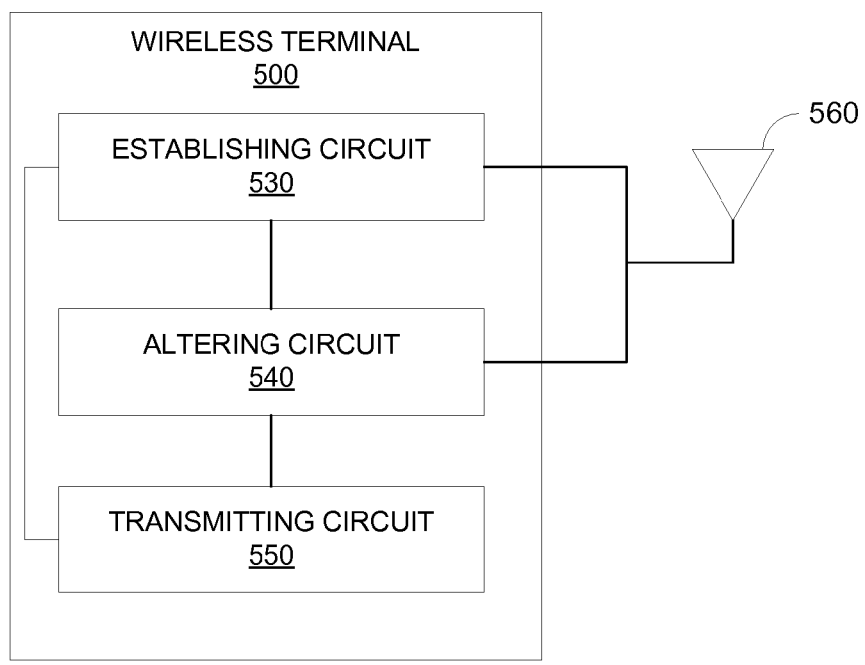
FIG. 5 shows an exemplary functional block diagram of another wireless terminal.

FIG. 5 shows an exemplary functional block diagram of another wireless terminal. Those skilled in the art will appreciate that a wireless terminal may have more components than the simplified wireless terminal 500 illustrated in FIG. 5. The wireless terminal 500 includes only those components useful for describing some prominent features of implementations within the scope of the claims. Wireless terminal 500 includes an establishing circuit 530, an altering circuit 540, a transmitting circuit 550, and an antenna 560. In one implementation the establishing circuit 530 is configured to establish a wireless communication link. In one implementation, means for establishing includes an establishing circuit 530. In one implementation, the altering circuit 540 is configured to alter an acknowledgement indicator used by the transmitting circuit base in part on a condition of the wireless communication link and a type of wireless communication. In some implementations, the means for altering includes an altering circuit 540. The transmitting circuit 550 may transmit data, including the acknowledgement indicator, to a base station via the antenna 560. In one implementation, means for transmitting includes a transmitting circuit 550.

A wireless terminal may comprise, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may comprise an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may comprise a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A device configured to communicate via a wireless communication link, the device comprising:
    a transceiver configured to transmit a data packet comprising an acknowledgement indicator over the wireless communication link; and
    a controller configured to generate the data packet and the acknowledgement indicator, wherein the acknowledgement indicator indicates a request for acknowledgement, the controller further configured to set the acknowledgement indicator not to request an acknowledgment when at least a quality of the wireless communication link is less than a threshold indicating that a condition of the wireless communication link is poor and a type of wireless communication that is being transmitted by the device is a multi-radio access bearer communication.

2. The device of claim 1, wherein the condition of the wireless communication link is further determined from at least one of an error rate for signals received by the device, a number of packet re-transmissions from the device, a current transmit power of the device or a reset of the wireless communication link.

3. The device of claim 1, wherein controller is further configured to:
    switch from a radio link control (RLC) acknowledged mode to a device-initiated unacknowledged mode to set the acknowledgement indicator not to request the acknowledgement when the type of wireless communication is the multi-radio access bearer communication and the quality of the wireless communication link is less than the threshold indicating that the condition of the wireless communication link is poor.

4. The device of claim 1, wherein the acknowledgement indicator comprises a bit in a packet header field.

5. The device of claim 1, wherein the wireless communication link comprises a universal mobile telecommunication system.

6. The device of claim 1, wherein the wireless communication link comprises a 3G system.

7. A method of wireless communication, comprising:
    establishing a wireless communication link;
    setting an acknowledgement indicator for a data packet not to request an acknowledgment when at least a quality of the wireless communication link is less than a threshold indicating that a condition of the wireless communication link is poor and a type of wireless communication being transmitted is the multi-radio access bearer communication; and
    transmitting the data packet comprising the acknowledgement indicator over the wireless communication link.

8. The method of claim 7, further comprising:
    switching from a radio link control (RLC) acknowledged mode to a device-initiated unacknowledged mode to set the acknowledgement indicator not to request the acknowledgement when the type of wireless communication is the multi-radio access bearer communication and the quality of the wireless communication link is less than the threshold indicating that the condition of the wireless communication link is poor.

9. The method of claim 7, wherein the condition of the wireless communication link is further determined from at least one of an error rate for signals received by the device, a number of packet re-transmissions from the device, or a reset of the wireless communication link.

10. The method of claim 7, wherein setting the acknowledgement indicator comprises setting a packet header value.

11. A device configured to communicate via a wireless communication link, the device comprising:
  means for establishing the wireless communication link;
  means for setting an acknowledgement indicator for a data packet not to request an acknowledgment when at least a quality of the wireless communication link is less than a threshold indicating that a condition of the wireless communication link is poor and a type of wireless communication being transmitted by the device; and
  means for transmitting the data packet comprising the acknowledgement indicator.

12. The device of claim 11, further comprising:
  means for switching from a radio link control (RLC) acknowledged mode to a device-initiated unacknowledged mode to set the acknowledgement indicator not to request the acknowledgement when the type of wireless communication is the multi-radio access bearer communication and the quality of the wireless communication link is less than the threshold indicating that the condition of the wireless communication link is poor.

13. The device of claim 11, wherein the condition of the wireless communication link is further determined from at least one of an error rate for signals received by the device, a number of packet re-transmissions from the device, or a reset of the wireless communication link.

14. The device of claim 11, wherein the means for setting the acknowledgement indicator comprises means for setting a packet header value.

15. A non-transitory computer readable storage medium comprising instructions that, when executed by a processor of an apparatus, cause the apparatus to:
  establish a wireless communication link;
  set an acknowledgement indicator for a data packet not to request an acknowledgment when at least a quality of the wireless communication link is less than a threshold indicating that a condition of the wireless communication link is poor and a type of wireless communication being transmitted by the apparatus is a multi-radio bearer access communication; and
  transmit the data packet comprising the acknowledgement indicator over the wireless communication link.

16. The computer readable storage medium of claim 15, further comprising instructions that, when executed by a processor of the apparatus, cause the apparatus to:
  switch from a radio link control (RLC) acknowledged mode to a device-initiated unacknowledged mode to set the acknowledgement indicator not to request the acknowledgement when the type of wireless communication is the multi-radio access bearer communication and the quality of the wireless communication link is less than the threshold indicating that the condition of the wireless communication link is poor.

17. The computer readable storage medium of claim 15, wherein the condition of the wireless communication link is further determined from at least one of a quality of a wireless signal received by the device, an error rate for signals received by the device, a number of packet re-transmissions from the device, or a reset of the wireless communication link.

18. The computer readable storage medium of claim 15, wherein setting the acknowledgement comprises setting a packet header value.

19. The device of claim 1, wherein the controller is further configured to:
  determine the quality of the wireless communication link; and
  determine whether to switch a radio link control (RLC) mode based on the quality of the wireless communication link.

20. The device of claim 19, wherein the determine the quality is based on at least one of the following: a received signal code power, a received signal strength, a pilot channel quality, a channel quality indicator, a block error rate, a number of packets re-transmitted by a wireless terminal, a number of packets acknowledged by a base station, a number of packets unacknowledged by a base station, an occurrence of a radio link control layer reset, or a transmit power of the device exceeding a threshold.

21. The method of claim 7 further comprising:
  determining the quality of the wireless communication link; and
  determining whether to switch a radio link control (RLC) mode based on the quality of the wireless communication link.

22. The method of claim 21, wherein the determining the quality is based on at least one of the following: a received signal code power, a received signal strength, a pilot channel quality, a channel quality indicator, a block error rate, a number of packets re-transmitted by a wireless terminal, a number of packets acknowledged by a base station, a number of packets unacknowledged by a base station, an occurrence of a radio link control layer reset, or a transmit power of the device exceeding a threshold.

23. The device of claim 11 further comprising:
  means for determining the quality of the wireless communication link; and
  means for determining whether to switch a radio link control (RLC) mode based on the quality of the wireless communication link.

24. The device of claim 23, wherein the means for determining the quality uses at least one of the following in determining the quality: a received signal code power, a received signal strength, a pilot channel quality, a channel quality indicator, a block error rate, a number of packets re-transmitted by a wireless terminal, a number of packets acknowledged by a base station, a number of packets unacknowledged by a base station, an occurrence of a radio link control layer reset, or a transmit power of the device exceeding a threshold.

25. The non-transitory computer readable storage medium of claim 15 further comprising instructions that, when executed by the processor of the apparatus, cause the apparatus to:
  determine the quality of the wireless communication link; and
  determine whether to switch a radio link control (RLC) mode based on the quality of the wireless communication link.

26. The non-transitory computer readable storage medium of claim 25, wherein the determine the quality is based on at least one of the following: a received signal code power, a received signal strength, a pilot channel quality, a channel quality indicator, a block error rate, a number of packets re-transmitted by a wireless terminal, a number of packets acknowledged by a base station, a number of packets unacknowledged by a base station, an occurrence of a radio link control layer reset, or a transmit power of the device exceeding a threshold.

27. The device of claim 1, wherein the controller is further configured to:
    switch from a device-initiated unacknowledged mode to a radio link control (RLC) acknowledged mode to set the acknowledgement indicator to request the acknowledgement when the type of wireless communication is the multi-radio access bearer communication and the quality of the wireless communication link is greater than a threshold indicating that the condition of the wireless communication link is good.

* * * * *